United States Patent [19]

Bastioli et al.

[11] Patent Number: 5,360,830

[45] Date of Patent: * Nov. 1, 1994

[54] EXPANDED ARTICLES OF BIODEGRADABLE PLASTIC MATERIALS

[75] Inventors: Catia Bastioli; Vittorio Bellotti, both of Novara; Luciano Del Giudice, Milan; Roberto Lombi; Angelos Rallis, both of Novara, all of Italy

[73] Assignee: Novamont S.p.A., Milan, Italy

[*] Notice: The portion of the term of this patent subsequent to Feb. 22, 2011 has been disclaimed.

[21] Appl. No.: 198,510

[22] Filed: Feb. 18, 1994

Related U.S. Application Data

[63] Continuation-in-part of Ser. No. 972,875, Nov. 4, 1992, Pat. No. 5,288,765, which is a continuation of Ser. No. 663,823, Mar. 27, 1991.

[30] Foreign Application Priority Data

Aug. 3, 1989 [IT] Italy .................. 67667 A/89

[51] Int. Cl.$^5$ ................................. C08J 9/08
[52] U.S. Cl. ........................... 521/84.1; 521/149; 521/916
[58] Field of Search ............... 521/84.1, 149, 916

[56] References Cited

U.S. PATENT DOCUMENTS

| | | |
|---|---|---|
| 2,788,546 | 4/1957 | Mellier et al. . |
| 3,116,351 | 12/1963 | Wohlrabe . |
| 3,117,014 | 1/1964 | Klug . |
| 3,137,592 | 6/1964 | Protzman et al. . |
| 3,243,308 | 3/1966 | Barger et al. . |
| 3,265,509 | 8/1966 | Wurzburg et al. . |
| 3,265,510 | 8/1966 | Wurzburg et al. . |
| 3,336,429 | 8/1967 | Carevie . |
| 3,407,070 | 10/1968 | Murray et al. . |
| 3,652,542 | 1/1972 | Hjermstad . |
| 3,891,624 | 6/1975 | Boonstra et al. . |
| 3,954,104 | 5/1976 | Kraskin et al. . |
| 3,962,155 | 6/1976 | Usamato et al. . |
| 4,026,986 | 5/1977 | Christen et al. . |
| 4,076,846 | 2/1978 | Nakatsuka et al. . |
| 4,125,495 | 11/1978 | Griffen . |
| 4,156,759 | 5/1979 | Hostettler . |
| 4,218,350 | 8/1980 | Griffin . |
| 4,232,047 | 11/1980 | Sair et al. . |
| 4,482,386 | 11/1984 | Wittwer et al. . |
| 4,576,284 | 3/1986 | Wittwer et al. . |
| 4,591,475 | 5/1986 | Tomka et al. . |
| 4,655,840 | 4/1987 | Wittwer et al. . |
| 4,673,438 | 6/1987 | Wittwer et al. . |
| 4,738,724 | 4/1988 | Wittwer et al. . |
| 4,790,881 | 12/1988 | Wittwer et al. . |
| 4,863,655 | 9/1989 | Lacourse et al. . |
| 4,900,361 | 2/1990 | Sachetto et al. . |
| 5,035,930 | 7/1991 | Lacourse et al. . |
| 5,043,196 | 8/1991 | Lacourse et al. . |
| 5,095,054 | 3/1992 | Lay et al. . |
| 5,288,765 | 2/1994 | Bastioli et al. .......... 521/84.1 |

FOREIGN PATENT DOCUMENTS

| | | |
|---|---|---|
| 0032802 | 7/1981 | European Pat. Off. . |
| 87847 | 6/1987 | European Pat. Off. . |
| 0282451A2 | 3/1988 | European Pat. Off. . |
| 0303460A1 | 8/1988 | European Pat. Off. . |
| 03034401A2 | 8/1988 | European Pat. Off. . |
| 0282451 | 9/1988 | European Pat. Off. . |
| 0298920 | 1/1989 | European Pat. Off. . |
| 0326517A1 | 1/1989 | European Pat. Off. . |
| 0327505A2 | 1/1989 | European Pat. Off. . |
| 0304401 | 2/1989 | European Pat. Off. . |

(List continued on next page.)

OTHER PUBLICATIONS

Relationship Between Amylose Content and Extrusion-Expansion Properties of Corn Starches by R. Chinnaswamy et al. (1988).

(List continued on next page.)

*Primary Examiner*—Morton Foelak

[57] ABSTRACT

Expanded articles of biodegradable plastic material having a closed pore structure and a density of from 0.01 to less than 0.1 g/cm$^3$ are produced by extrusion of a composition including starch and a synthetic polymer selected from ethylene-vinyl alcohol, ethylene-acrylic acid, and mixture thereof.

7 Claims, No Drawings

FOREIGN PATENT DOCUMENTS

| | | |
|---|---|---|
| 0344118A2 | 5/1989 | European Pat. Off. |
| 0326517 | 8/1989 | European Pat. Off. |
| 0327505 | 8/1989 | European Pat. Off. |
| 0366256A2 | 9/1989 | European Pat. Off. |
| 0388924 | 9/1990 | European Pat. Off. |
| 0391853 | 10/1990 | European Pat. Off. |
| 0400532 | 12/1990 | European Pat. Off. |
| 0404723 | 12/1990 | European Pat. Off. |
| 0404727 | 12/1990 | European Pat. Off. |
| 0404728 | 12/1990 | European Pat. Off. |
| 0407350 | 1/1991 | European Pat. Off. |
| 0408501 | 1/1991 | European Pat. Off. |
| 0408502 | 1/1991 | European Pat. Off. |
| 0408503 | 1/1991 | European Pat. Off. |
| 0409781 | 1/1991 | European Pat. Off. |
| 0409782 | 1/1991 | European Pat. Off. |
| 0409783 | 1/1991 | European Pat. Off. |
| 0409788 | 1/1991 | European Pat. Off. |
| 0409789 | 1/1991 | European Pat. Off. |
| 53-19645 | 6/1978 | Japan. |
| 965349 | 7/1964 | United Kingdom. |
| 2187703A | 3/1987 | United Kingdom. |
| 2190093 | 11/1987 | United Kingdom. |
| 2214920A | 2/1988 | United Kingdom. |
| 8802313 | 10/1988 | United Kingdom. |
| 2214919A | 9/1989 | United Kingdom. |
| WO83/02935 | 1/1983 | WIPO. |
| WO90/05161 | 10/1989 | WIPO. |
| WO90/10671 | 9/1990 | WIPO. |
| WO91/02023 | 2/1991 | WIPO. |
| WO91/02024 | 2/1991 | WIPO. |
| WO91/02025 | 2/1991 | WIPO. |

OTHER PUBLICATIONS

Optimum Extrusion–Cooking Conditions for Maximum Expansion of Corn Starch by R. Chinnaswamy et al. (1988).

Expansion, Color and Shear Strength–Properties of Corn Starches Extrusion–Cooked with Urea and Salts by R. Chinnaswamy et al. (1988).

Effect of Extrusion–Cooking on Potato Starch Using a Twin Screw French Extruder by C. Mercier (1977).

Structure and Digestibility Alterations of Cereal Starches by Twin–Screw Extrusion Cooking by C. Mercier.

Modification of Carbohydrate Components by Extrusion–Cooking of Cereal Products by C. Mercier et al (May/Jun. 1975).

Formation of Amylose–Lipid Complexes by Twin–Screw Extrusion Cooking of Manioc Starch by C. Mercier et al.

Structural Modification of Various Starches by Extrusion Cooking With a Twin–Screw French Extruder by C. Mercier, et al. (Dec. 31, 1985).

Influence of Water–Insoluble Rye and Wheat Pentosan ... Changes in Various Starches (Sep. 1973).

Otey, F. H. et al., Ind. Eng. Chem. Res. 26(8):1659–63 (1987), "Starch–Based Blown Films".

EXPANDED ARTICLES OF BIODEGRADABLE PLASTIC MATERIALS

This is a continuation-in-part of U.S. Pat. application Ser. No. 07/972,875, filed Nov. 4, 1992 U.S. Pat. No. 5,288,765, which is a continuation of U.S. Pat. application Ser. No. 07/663,823 filed Mar. 27, 1991, now abandoned, which are incorporated by reference.

TECHNICAL FIELD

The present invention relates to expanded articles of biodegradable plastic material.

BACKGROUND OF THE INVENTION

In recent years, many attempts have been made to produce biodegradable molded articles. Among the various materials proposed for producing such articles, the starches are certainly the most desirable since they are cheap, natural products which are very abundant in nature and are completely biodegradable.

European Patent Application No. EP-A-304,401 describes a method for the injection-molding of capsules from destructurized starch. The articles produced by this process, however, have poor mechanical properties as well as being very soluble in water.

Unpublished Italian Patent Application No. 41002-A/89 and the corresponding published International Application No. WO 90/10671 describe a method for producing molded articles with improved mechanical properties in which the starch is mixed with an ethylene-acrylic acid copolymer, possibly with the addition of urea and/or ammonia, in an extruder heated to a temperature of between 90° and 150° C. In this method, the water content of the extrusion is brought to less than 6% by weight, preferably less than 2% by weight, and the resulting composition is then extruded at a temperature of between 130° and 160° C.

European Patent Application No. EP-A-0 87 847 describes a process for preparing foamed gelatinized products made of starch by heating granular or pulverized starch in an extruder press at a temperature of from 60° to 220° C in the presence of 10–30% by weight of water and a gas-forming or gas-generating expanding agent. The obtained foamed material has open pores and high water solubility, which make it suitable for use only as packing material for the protection of fragile articles, as a sound-absorbing or thermal-insulating material, or as a foodstuff.

SUMMARY OF THE INVENTION

The present invention provides expanded articles of biodegradable plastic material having a low density in which the material includes starch and a synthetic polymer selected from the group consisting of ethylene-vinyl alcohol, ethylene-acrylic acid, and mixtures thereof. The expanded articles have a closed pore structure and a density of from 0.01 to 0.1 g/cm$^3$.

DETAILED DESCRIPTION OF THE INVENTION

The purpose of the present invention is to provide expanded articles which, in addition to being substantially biodegradable, are water insoluble, can be obtained by a conventional processing technique for thermoplastic materials such as extrusion or injection molding, and have mechanical properties such as bending strength and elongation comparable to conventional foamed plastics.

In view of that purpose, the present invention consists of expanded articles made of a material including starch and a synthetic polymer selected from the group consisting of ethylene-acrylic acid and ethylene-vinyl alcohol copolymers and mixtures thereof, such articles having a closed pore structure and a density of from 0.01 to 0.1 g/cm$^3$.

The ethylene/vinyl alcohol copolymer which is used for production of the expanded article has, preferably, an ethylene content of from 10 to 40% by weight (15–50% mol), more preferably from 30 to 35% mol, with a melt flow index (230° C., 2.16 kg) of between 2 and 50, preferably between 6 and 20.

Further preferred features for the ethylene/vinyl alcohol copolymer are:

| | |
|---|---|
| Intrinsic viscosity (in DMSO at 30° C.) | 0.50–0.90 preferably 0.65–0.80 |
| Molecular weight distribution Mw/Mn (GPC in tetrahydrofurane) | 1.3–4 |
| Melting point temperature | 180° C. preferably 160–170° C. |
| Hydrolysis degree* | 90–99.9% |

*Basic hydrolysis and titration of the residual base with acid.

The ethylene/vinyl alcohol copolymer can also be oxidized, terminated with fat acids, grafted with polycaprolactone, or modified with acrylic or methacrylic monomers and/or pyridinium.

The preferred ethylene-acrylic acid copolymer (EAA) is produced by copolymerization of a mixture including from 3 to 30%, preferably 20% by weight of acrylic acid and, correspondingly, from 97 to 70%, preferably 80%, by weight of ethylene.

The starch which is used comprises in general all the starches of a natural or vegetable origin composed essentially of amylose and/or amylopectin. They can be extracted from various plants such as, for example, potatoes, rice, tapioca, and maize, and from cereals such as rye, oats and wheat. Maize starch is preferred. Chemically-modified starches can also be used.

The starch and the synthetic polymer may be used in a ratio of from 9:1 to 1:9 and preferably in a ratio of from 4:1 to 1:4. However, the invention is particularly concerned with articles where the synthetic polymer constitutes from 20 to 40% by weight referred to the total amount of starch and polymer.

The expanded articles according to the invention may be obtained by using a physical expanding agent, such as carbon dioxide and n-pentane, or a chemical expanding agent, such as carbonate salts, which are fed to the extrusion barrel together with the blend of starch and polymeric material.

According to a preferred method, sodium bicarbonate is used together with a polymeric acid compatible with starch.

The present invention also provides a method for the production of expanded articles of biodegradable plastics material, in which a composition including starch and a synthetic polymer selected from the group consisting of ethylene-vinyl alcohol and ethylene-acrylic acid copolymers and mixtures thereof, is extruded in the presence of a polymeric acid and sodium bicarbonate as the expanding agent.

The use of sodium bicarbonate as a chemical expanding agent for the production of expanded articles of conventional synthetic plastic material is known; however, its use as the only expanding agent produces expanded plastic materials with rather poor properties in terms of expansion. In practice, therefore, the sodium bicarbonate is advantageously used only as a nucleating agent in conjunction with a physical expanding agent, as in the production of expanded-polystyrene sheets. Its use as an expanding agent for starch, as shown in European Patent Application No. EP-A-0 087 847, provides an open pore structure which is unsuitable for the purposes of the present invention.

Within the scope of the method according to the invention, however, it has been found that in combination with the aforementioned polymeric acid, sodium bicarbonate has an effective expanding action which enables the production of expanded materials with densities down to 0.01 g/cm$^3$, generally between 0.01 and 0.1 g/cm$^3$.

Without wishing to go into the physical-chemical mechanism of the expansion, it is thought possible that, in the method according to the present invention, the expansion is not caused by the thermal decomposition of bicarbonate but takes place as a result of a chemical reaction between the carboxyl groups of the polymer being used and the bicarbonate, with the liberation of carbon dioxide and water.

The polymeric acid which is used is preferably a polymer having lateral carboxyl groups such as polyacrylic acid, ethylene-acrylic acid copolymers (EAA) and ethylene-vinyl alcohol-acrylic acid copolymers. The same preferred EAA described earlier in the specification may be used.

The extrusion temperature may range from 100° to 250° C., depending upon the choice of the copolymer which is mixed with the starch. The preferred temperature range is 180° to 210° C.

In the embodiment where both the copolymer which is mixed with starch and the polymeric acid are EAA copolymers, the extrusion temperature may be as low as 100° to 120° C. and is preferably between 100° and 110° C., i.e., below the temperature of thermal decomposition of the bicarbonate. The fact that, according to this embodiment, the best results in terms of expansion were achieved when the extrusion was carried out in an extruder heated to a temperature below the temperature of thermal decomposition of bicarbonate, corroborates the hypothesis that the expansion is caused by the generation of carbon dioxide and water as a result of the chemical reaction between the carboxyl groups of the polymeric acid and the bicarbonate.

The quantity of sodium bicarbonate added is at least 0.3 of the equivalent weight of the bicarbonate for each equivalent weight of free carboxyl groups in the polymeric acid.

In order to facilitate the expansion, nucleating agents, such as, for example, silicas may be included in the polymeric composition.

If it is desired to further reduce the density of the foamed (extruded) articles, it is advantageous to add a filler to the polymeric composition within the extruder, such as a pyrolized foamed starch in granular form which may be obtained from the process of European Patent Application No. EP-A-0 087 847, or hollow glass microspheres, in a quantity up to 30% by weight with respect to the overall composition and preferably between 5 and 20% by weight.

The extrusion process is carried out in such a way that the starch is substantially destructured and the starch phase interpenetrates the copolymer phase.

In order to encourage the destructuring of the starch, which has its own intrinsic water content generally of between 10 and 13% by weight, water may be added up to a quantity of approximately 25% by weight of the weight of the dry starch. The water content of the final product, however, must be less than 6% and is preferably between 0 and 2% by weight. However, in the absence of plasticizers, a higher amount of water may be needed and the water content in the final product may then be 2 to 20%, preferably 5 to 17%, by weight.

The composition which is extruded may also include urea up to 30% of the total composition, and high boiling plasticizers, such as glycerine, ethyl glycol and the like. Further additives may be considered dependent upon the desired characteristics and applications of the expanded material to be produced. The additives may include polymeric materials such as polyvinyl alcohol and conventional additives used in the preparation of plastic materials, such as UV stabilizers, flame-proofing agents, fungicides, herbicides, antioxidants, fertilizers, opacifying agents, antiblocking agents, lubricants and plasticizers.

The composition which is extruded may also include one or more nucleating agents in a quantity by weight of between 0.005 and 5%, preferably between 0.05 and 3%, more preferably between 0.2 and 2%. Nucleating agents which can be utilized are, for example, talc (magnesium silicate), calcium carbonate, etc., which may optionally be superficially treated with adhesion promoters such as silanes, titanates, etc. Moreover, organic fillers may be employed, such as yeast shells from the beet working, beet pulp dried, ground and powdered, wood powder, cellulose powder, etc.

Expanded articles can also be produced by the addition of sodium bicarbonate to pellets of starch and a compatible polymer produced beforehand by the method described in International Patent Application No. PCT/EP90/00375, the content of which is incorporated by reference.

The following examples are considered illustrative of the present invention.

EXAMPLE 1

A composition was prepared containing:
(a) 68% by weight of potato starch;
(b) 22% by weight of an ethylene-vinyl alcohol copolymer having an ethylene comonomer content of 38% by moles and an hydrolysis degree >99.8%;
(c) 9.8% by weight of water; and
(d) 0.2% of glycerine monooleate.

The composition was extruded in a double-screw extruder having a diameter d of 30 mm and a ratio L/d of 3, operating with the following temperature profile: 90°-150°-180°-170°-155° C. The degassing was set so that the granulated product had a water content of 12% by weight.

From this granulated product, the following composition was prepared:
(a) 95% by weight of the granulated product obtained above;
(b) 3% by weight of the Dow Chemical EAA 5981 copolymer with a 20% acrylic acid comonomer content; and
(c) 2% by weight of sodium bicarbonate.

The composition was extruded in a single-screw extruder having a diameter of d of 40 mm and a ratio L/d of 28, operating at a temperature of 180° C., through a nozzle having a diameter of 2 mm, with a flow ram of about 50 kg/h.

The expanded product had a density of 0.020 g/cm$^3$, with average closed-cell dimensions of about 0.25 mm.

EXAMPLE 2

A composition was prepared containing:
(a) 68% by weight of potato starch;
(b) 16% by weight of polyvinyl alcohol Goshenol GH 23 (Nippon Gohsei);
(c) 6% by weight of an ethylene-vinyl alcohol copolymer having an ethylene comonomer content of 38% by moles and an hydrolysis degree >99.8%;
(d) 9.8% by weight of water; and
(e) 0.2% of glycerine monooleate.

This composition was extruded under the same conditions as in Example 1.

From this granulated product, the following composition was prepared:
(a) 93% by weight of the granulated product obtained above;
(b) 4.5% by weight of the Dow Chemical EAA 5981 copolymer with a 20% acrylic acid comonomer content; and
(c) 2.5% by weight of sodium bicarbonate.

The composition was extruded in a single-screw extruder having a diameter d of 40 mm and a ratio L/d of 28, operating at the temperature of 180° C., through a nozzle having a diameter of 2 mm with a flow rate of about 50 kg/h.

The expanded product had a density of 0.018 g/cm$^3$ with average closed-cell dimensions of about 0.35 mm.

EXAMPLE 3

A composition was prepared containing:
(a) 36% by weight of the starch GLOBE 3401 CERESTAR with a water content of 11%;
(b) 36% by weight of the Dow Chemical copolymer EAA 5981 with a 20% acrylic acid content;
(c) 6% by weight of water;
(d) 14% of urea; and
(e) 8% by weight of sodium bicarbonate.

The products were premixed and then supplied to an extruder for the extrusion of expanded tubing. The temperature in the extruder was kept within the range of between 100° and 110° C.

The expanded product had a density of approximately 0.15 g/cm$^3$ with closed-cell dimensions of between 0.3 mm and 1 mm and elongation higher than 10%.

EXAMPLE 4

A composition was prepared containing:
(a) 36% by weight of starch GLOBE 3401 CERESTAR;
(b) 18% by weight of the EAA copolymer DOW 5981;
(c) 6% by weight of water;
(d) 9% by weight of glycerine;
(e) 5% by weight of urea;
(f) 18% ethylene-vinyl alcohol (ethylene comonomer content 30% mol); and
(g) 8% by weight sodium bicarbonate.

The composition was mixed in the extruder barrel at 170° C. and injection-molded to provide a slab specimen having dimensions 3×120×20 mm.

The expanded product had a density of about 0.3 g/cm$^3$ with closed-cell dimensions between 0.5 and 2.5 mm.

We claim:
1. Expanded articles of biodegradable plastic material comprising a material including starch and a synthetic polymer selected from the group consisting of ethylene-vinyl alcohol, ethylene-acrylic acid, and mixtures thereof, said articles having a closed pore structure and a density of from 0.01 to less than 0.1 g/cm$^3$.

2. Expanded articles according to claim 1, wherein the ethylene-vinyl alcohol copolymer has an ethylene content of from 10 to 40% by weight and a melt flow index of from 6 to 20.

3. Expanded articles according to claim 1, wherein the ethylene-acrylic acid copolymer is produced by the copolymerization of a mixture including from 3 to 30% by weight of acrylic acid and from 97 to 70% of ethylene.

4. Expanded articles according to claim 1, wherein the starch and the synthetic polymer are in a weight ratio of from 9:1 to 1:9.

5. Expanded articles according to claim 1, further including a polymeric acid selected from the group consisting of polyacrylic acid and ethylene-acrylic acid-vinyl alcohol copolymer.

6. Expanded articles according to claim 1, further including a filler consisting of granular pyrolized foamed starch or hollow glass microspheres.

7. Expanded articles according to claim 1, further including polyvinyl alcohol.

* * * * *